United States Patent
Samanta et al.

(10) Patent No.: US 12,206,732 B2
(45) Date of Patent: Jan. 21, 2025

(54) CONTROLLING TRANSFER OF DATA BASED ON NETWORK BANDWIDTH DEMAND

(71) Applicant: Dell Products L.P., Round Rock, TX (US)

(72) Inventors: Sisir Samanta, Bangalore (IN); Shibi Panikkar, Bangalore (IN)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 18/126,149

(22) Filed: Mar. 24, 2023

(65) Prior Publication Data

US 2024/0323252 A1 Sep. 26, 2024

(51) Int. Cl.
- *H04L 67/1014* (2022.01)
- *H04L 47/10* (2022.01)
- *H04L 47/283* (2022.01)
- *H04L 47/70* (2022.01)
- *H04L 47/80* (2022.01)
- *H04L 67/101* (2022.01)

(52) U.S. Cl.
CPC ........ *H04L 67/1014* (2013.01); *H04L 47/283* (2013.01); *H04L 47/29* (2013.01); *H04L 47/70* (2013.01); *H04L 47/803* (2013.01); *H04L 67/101* (2013.01)

(58) Field of Classification Search
None
See application file for complete search history.

(56) References Cited

U.S. PATENT DOCUMENTS

| | | | | |
|---|---|---|---|---|
| 6,539,026 B1* | 3/2003 | Waclawsky | ........... | H04L 47/781 370/428 |
| 7,120,806 B1* | 10/2006 | Codilian | ............... | G06F 1/3203 713/323 |
| 7,460,558 B2* | 12/2008 | Anand | .................. | H04L 47/822 370/468 |

(Continued)

OTHER PUBLICATIONS

Bigelow, Stephen J., What is edge computing? Everything you need to know, TechTarget, available at https://www.techtarget.com/searchdatacenter/definition/edge-computing (last accessed Mar. 24, 2023), last updated Dec. 2021.

*Primary Examiner* — Backhean Tiv

(74) *Attorney, Agent, or Firm* — Ryan, Mason & Lewis, LLP

(57) ABSTRACT

Methods, apparatus, and processor-readable storage media for controlling transfer of data based on network bandwidth demand are provided herein. An example method includes obtaining a request to transfer data corresponding to an application by at least one node of a plurality of nodes of a distributed computing system; identifying a category of the data, from among a plurality of categories, to be transferred by the application based on the request; and controlling the transfer of the data based on the identified category, where the controlling includes: causing the at least one node to transfer the data in response to the identified category being a first category of a plurality of categories; and causing the at least one node to at least delay the transfer of the data based on the category being a different category of the plurality of categories and an available network bandwidth of the distributed computing system.

20 Claims, 8 Drawing Sheets

(56) References Cited

U.S. PATENT DOCUMENTS

| | | | | |
|---|---|---|---|---|
| 8,045,458 B2* | 10/2011 | Alperovitch | | H04L 47/32 |
| | | | | 370/230 |
| 8,111,692 B2* | 2/2012 | Ray | | H04L 45/306 |
| | | | | 709/230 |
| 8,139,481 B2* | 3/2012 | Laulainen | | H04L 47/10 |
| | | | | 370/229 |
| 8,289,872 B2* | 10/2012 | Erramilli | | H04L 41/0896 |
| | | | | 370/252 |
| 8,526,513 B2* | 9/2013 | Xiao | | H04L 1/0018 |
| | | | | 375/259 |
| 8,767,534 B2* | 7/2014 | Bruninghaus | | H04W 8/04 |
| | | | | 370/468 |
| 9,391,840 B2* | 7/2016 | Pope | | H04L 47/32 |
| 9,413,672 B2* | 8/2016 | Vangala | | H04L 47/805 |
| 10,027,559 B1* | 7/2018 | Kerl | | H04L 41/0897 |
| 10,218,626 B2* | 2/2019 | Ooishi | | H04L 47/2458 |
| 11,350,908 B2* | 6/2022 | Martin | | G01S 7/5208 |
| 11,425,785 B2* | 8/2022 | Zhu | | H04W 88/06 |
| 11,595,901 B2* | 2/2023 | Luna | | H04W 52/0235 |
| 2004/0114536 A1* | 6/2004 | O'Rourke | | H04L 47/2416 |
| | | | | 370/252 |
| 2004/0252718 A1* | 12/2004 | Miyamoto | | H04L 47/781 |
| | | | | 370/468 |
| 2006/0095958 A1* | 5/2006 | Lehinger | | G06F 21/6245 |
| | | | | 726/6 |
| 2006/0133418 A1* | 6/2006 | Anand | | H04L 47/15 |
| | | | | 370/468 |
| 2007/0274209 A1* | 11/2007 | Aarnio | | H04L 1/0083 |
| | | | | 370/470 |
| 2009/0285201 A1* | 11/2009 | Ben-Haim | | H04L 47/10 |
| | | | | 370/468 |
| 2011/0246665 A1* | 10/2011 | Vange | | H04L 63/1458 |
| | | | | 709/233 |
| 2012/0149352 A1* | 6/2012 | Backholm | | H04W 52/02 |
| | | | | 455/418 |
| 2014/0113653 A1* | 4/2014 | Wendling | | H04L 41/0893 |
| | | | | 455/456.1 |
| 2014/0146677 A1* | 5/2014 | Howes | | H04L 47/2441 |
| | | | | 370/235 |
| 2015/0098390 A1* | 4/2015 | Efrati | | H04W 72/02 |
| | | | | 370/329 |
| 2017/0126579 A1* | 5/2017 | Meng | | H04L 47/788 |
| 2018/0324636 A1* | 11/2018 | Laha | | H04L 67/12 |
| 2020/0296158 A1* | 9/2020 | Haldar | | H04L 67/1095 |
| 2021/0075734 A1* | 3/2021 | Lin | | H04L 47/2433 |
| 2021/0365399 A1* | 11/2021 | Dai | | G06F 13/4221 |
| 2023/0224228 A1* | 7/2023 | Dahu | | H04L 41/5019 |
| | | | | 709/223 |

* cited by examiner

CONTROLLING TRANSFER OF DATA BASED ON NETWORK BANDWIDTH DEMAND

FIELD

The field relates generally to information processing, and more particularly to transferring data in information processing systems.

BACKGROUND

Edge computing generally refers to a distributed computing paradigm that positions data computation and data storage closer to the sources of data. Edge computing environments are highly distributed and decentralized, and therefore present many challenges for information technology (IT) operations.

SUMMARY

Illustrative embodiments of the disclosure provide techniques for controlling transfer of data based on network bandwidth demand. An exemplary computer-implemented method includes: obtaining a request to transfer data corresponding to at least one application by at least one node of a plurality of nodes of a distributed computing system; identifying at least one category of the data, from among a plurality of categories, to be transferred by the at least one application based on the request; and controlling the transfer of the data based at least in part on the identified at least one category, wherein the controlling comprises: (i) causing the at least one node to transfer the data in response to the identified at least one category being a first category of the plurality of categories; and (ii) causing the at least one node to at least delay the transfer of the data based at least in part on (a) the at least one identified category being a different category of the plurality of categories than the first category, and (b) an available network bandwidth of the distributed computing system.

Illustrative embodiments can provide significant advantages relative to conventional data transfer techniques. For example, technical problems associated with transferring data within a distributed computing environment are mitigated in one or more embodiments by identifying different categories of data to be transferred within an individual application and controlling transfers of the data based on the identified categories of data and bandwidth utilization information of the distributed computing environment.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Organizations utilizing conventional computing environments typically allocate higher network bandwidth to data centers and lower network bandwidth to endpoints. However, edge computing environments are becoming increasingly popular, and these environments generally require increased bandwidth across the network. Even the latest networks (e.g., fifth generation (5G) networks) have a limited amount of bandwidth. Thus, efficiently allocating network bandwidth can be critical for organizations utilizing edge computing resources.

Communicating data (e.g., usage data related to utilization information, performance metrics, security configurations, product configurations, process data, etc.) between components in an edge computing environment (e.g., between one or more edge nodes and one or more cloud servers) can consume significant amounts of network bandwidth, and thus can impact the performance of the system.

Figure 1:
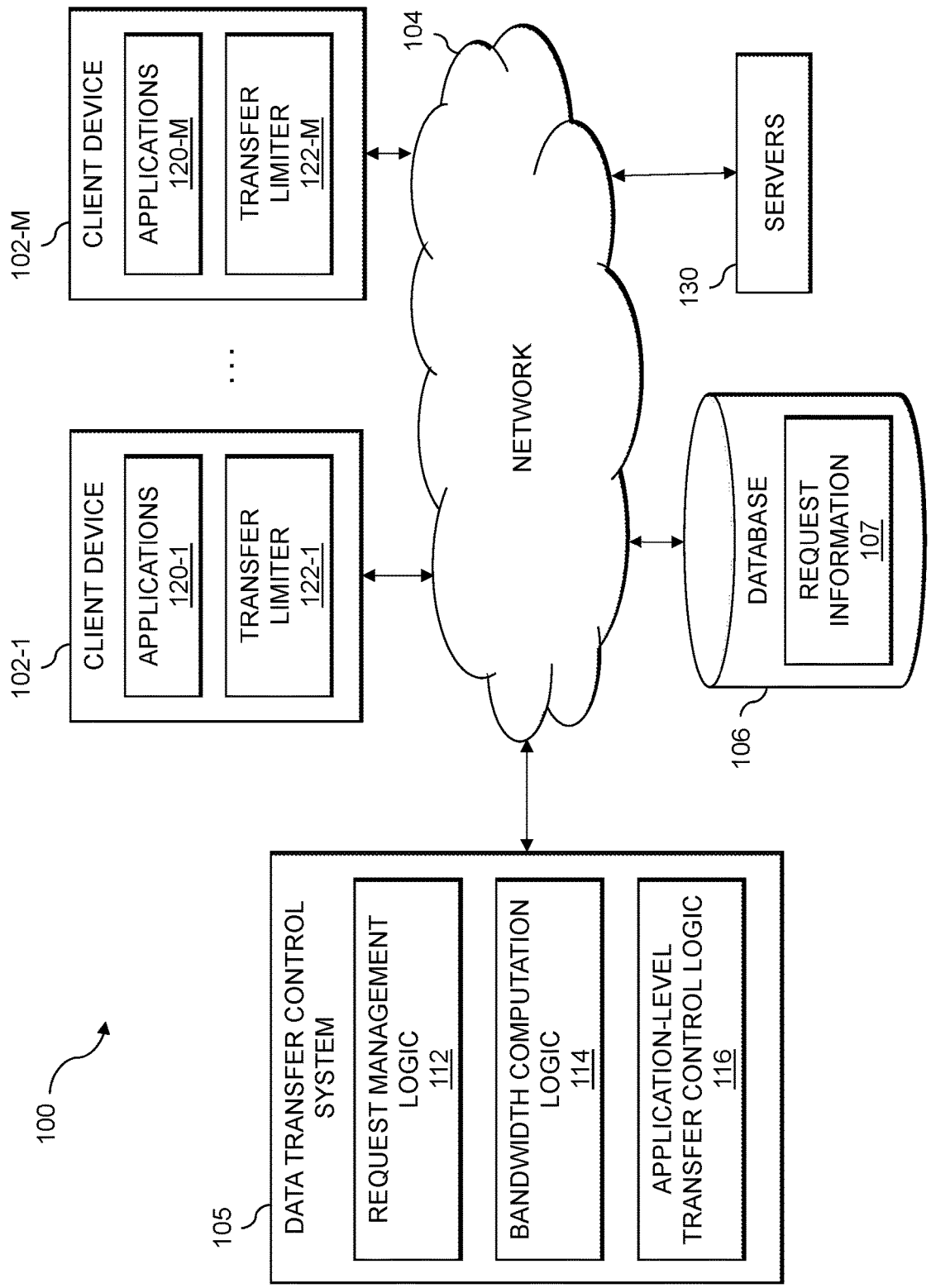
FIG. 1 shows an information processing system configured for controlling transfer of data based on network bandwidth demand in an illustrative embodiment.

FIG. 1 shows a computer network (also referred to herein as an information processing system) 100 configured in accordance with an illustrative embodiment. The computer network 100 comprises a plurality of client devices 102-1, . . . 102-M, collectively referred to herein as client devices 102. The client devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a data transfer control system 105 and one or more servers 130 (e.g., edge servers).

The client devices 102 and/or the one or more servers 130 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The client devices 102 and/or the one or more servers 130 in some embodiments comprise respective computers associated with one or more users and/or a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

In the FIG. 1 embodiment, it is assumed that each of the client devices 102 executes one or more respective applications 120-1, . . . 120-M. The client devices 102 also include respective transfer limiters 122-1, . . . 122-M (collectively transfer limiters 122). In the FIG. 1 embodiment, each client device 102 includes a single transfer limiter 122, however, it is to be appreciated that in other embodiments at least one of client devices 102 may include multiple transfer limiters (e.g., a client device 102-1 may include a transfer limiter for each of the applications 120-1).

The transfer limiter 122-1, for example, in some embodiments, can include functionality for sending requests related to data to be transferred by one or more of the applications 120-1. The transfer limiter 122-1 can also be configured to identify and map portions of the data to be transferred by the applications 120-1 to a set of categories (time critical, non-time critical etc.). In some embodiments, each request can include a category of data (e.g., time-critical, important, regular), a size of the data, and an expected transfer time of the data. It is assumed the data corresponding to the requests are to be transferred to one or more of the other client devices 102 and/or to at least one of the servers 130.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the data transfer control system 105 can have at least one associated database 106 configured to store data pertaining to, for example, request information 107. The request information 107, in at least some embodiments, can include one or more characteristics related to data transfer requests (e.g., from one or more of the client devices 102) such as a category of data to be transferred, a size of the data to be transferred, and/or an estimated time to transfer (TTT) the data.

An example database 106, such as depicted in the present embodiment, can be implemented using one or more storage systems associated with the data transfer control system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the data transfer control system 105 are one or more input-output devices, which illustratively comprise keyboards, displays or other types of input-output devices in any combination. Such input-output devices can be used, for example, to support one or more user interfaces to the data transfer control system 105, as well as to support communication between data transfer control system 105 and other related systems and devices not explicitly shown.

Additionally, the data transfer control system 105 in the FIG. 1 embodiment is assumed to be implemented using at least one processing device. Each such processing device generally comprises at least one processor and an associated memory, and implements one or more functional modules for controlling certain features of the data transfer control system 105.

More particularly, the data transfer control system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs. One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the data transfer control system 105 to communicate over the network 104 with the client devices 102 and/or the one or more servers 130, and illustratively comprises one or more conventional transceivers.

The data transfer control system 105 further comprises request management logic 112, bandwidth computation logic 114, and application-level transfer control logic 116.

The request management logic 112 can obtain one or more requests sent by the transfer limiters 122, and maintain information corresponding to active transfer requests, e.g., as request information 107 in the at least one database 106. The request management logic 112 may also include functionality for retrieving and updating the information corresponding to the active transfer requests.

The bandwidth computation logic 114 generally monitors a total bandwidth allocated to the one or more client devices 102 and the server 130, as well as bandwidth allocated to at least some of the applications 120 corresponding to one or more of the client devices 102. The bandwidth computation logic 114 can compute available bandwidth and bandwidth required to fulfill one or more of the active transfer requests, as explained in more detail elsewhere herein.

The application-level transfer control logic 116, in some embodiments, can control data transfers based at least in part on the category of data corresponding to the requests from the transfer limiters 122 and the bandwidth computations of bandwidth computation logic 114.

The FIG. 1 example shows the data transfer control system 105 separately from the client devices 102 and the servers 130; however, this is not intended to be limiting and in other embodiments at least a portion of the data transfer control system 105 can be implemented on at least one of the client devices 102 and/or at least one of the servers 130, for example.

It is to be appreciated that this particular arrangement of elements 112, 114 and 116 illustrated in the data transfer control system 105 of the FIG. 1 embodiment is presented by way of example only, and alternative arrangements can be used in other embodiments. For example, the functionality associated with the elements 112, 114 and 116 in other embodiments can be combined into a single module, or separated across a larger number of modules. As another example, multiple distinct processors can be used to implement different ones of the elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for data transfer control system 105 involving client devices 102 and/or the one or more servers 130 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the data transfer control system 105 and database(s) 106 can be on and/or part of the same processing platform.

An exemplary process utilizing elements 112, 114, and 116 of an example data transfer control system 105 in computer network 100 will be described in more detail with reference to, for example, the flow diagram of FIG. 6.

Figure 2:
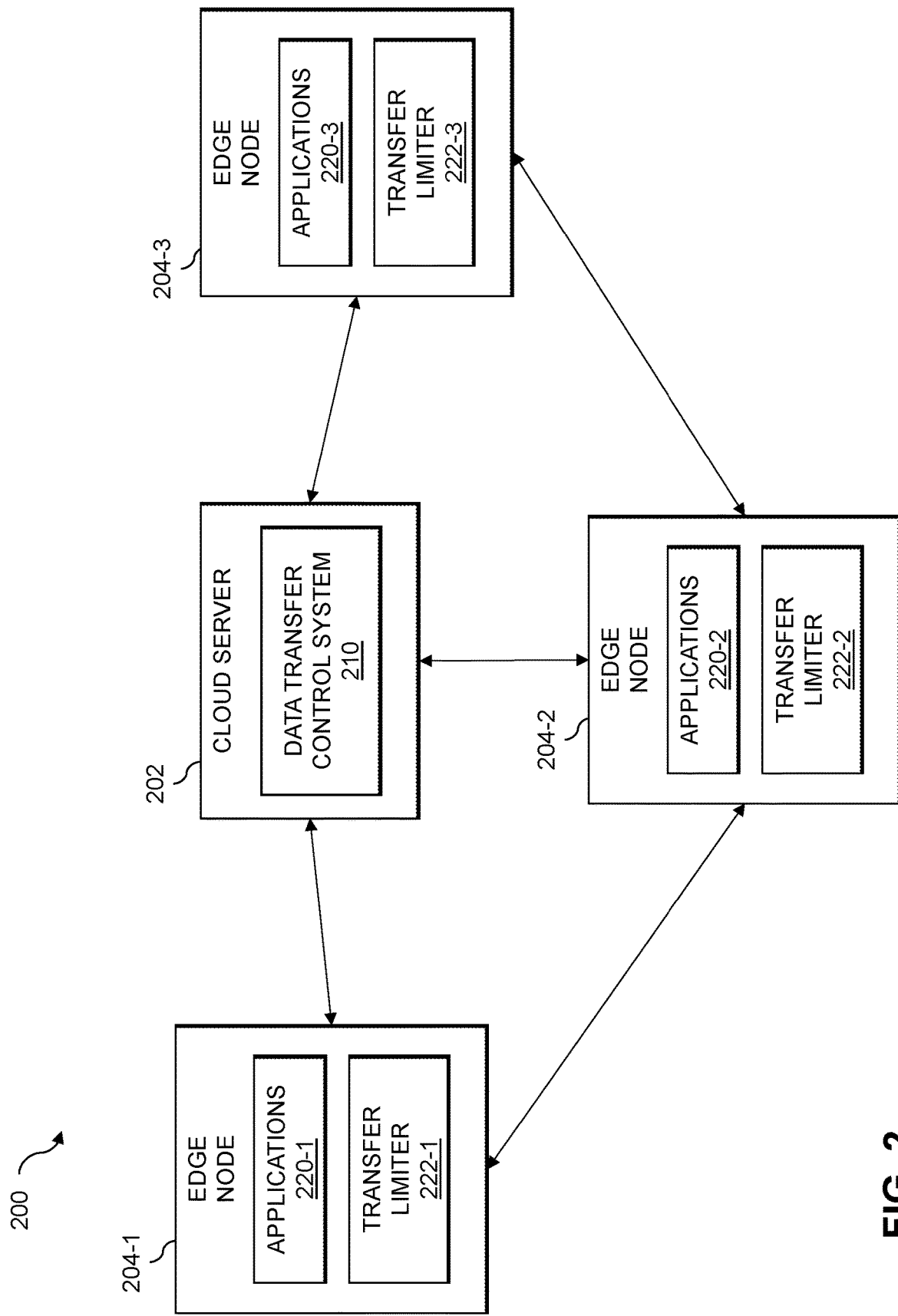
FIG. 2 shows an edge computing environment for controlling transfer of data in an illustrative embodiment.

FIG. 2 shows an example of an edge computing environment 200 in an illustrative embodiment. The edge computing environment 200 includes three edge nodes 204-1, 204-2, and 204-3 (collectively edge nodes 204) that are connected to a cloud server 202. For example, the edge nodes 204 may correspond to client devices 102, and the cloud server 202 may correspond to at least one of the servers 130. It is assumed that each edge node 204-1, 204-2, and 204-3 executes one or more applications 220-1, 220-2, and 220-3 (collectively applications 220), respectively, where at least some of the applications 220-1 are assumed to transfer (e.g., send and/or receive) data to one or more other edge nodes 204 and/or to cloud server 202 using bandwidth allocated for edge computing environment 200. The edge nodes 204 also are configured with respective transfer limiters 222-1, 222-2, and 222-3 (collectively transfer limiters 222).

Figure 3:
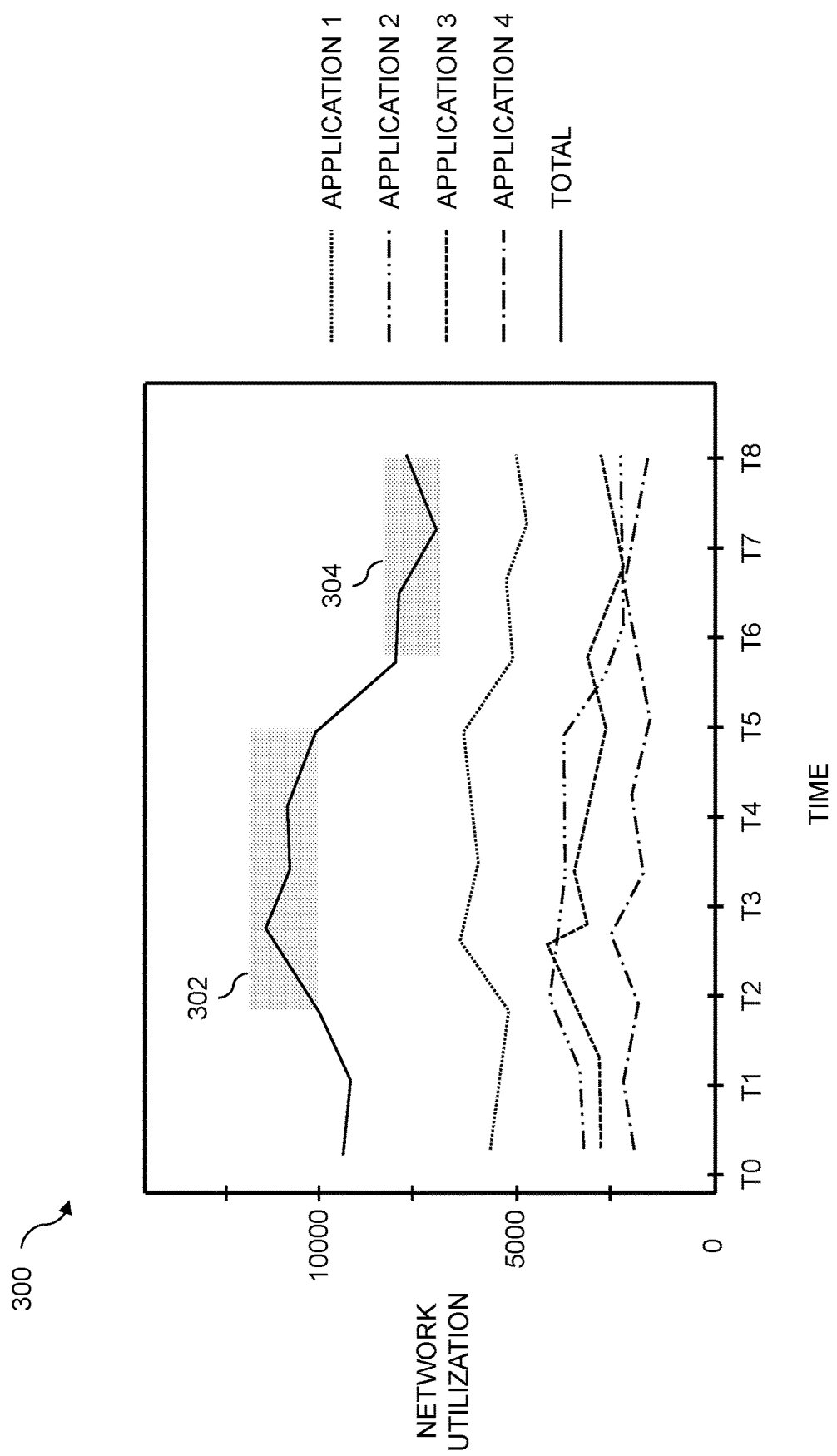
FIG. 3 shows a plot representing network utilization for different applications in an illustrative embodiment.

As a non-limiting example, four applications may be implemented in the edge computing environment 200, wherein each of the edge nodes 204 execute one or more of the four applications. FIG. 3 shows a plot 300 representing network utilization for the four different applications over time in an illustrative embodiment. The network utilization for each of the four different applications is shown with different line dashing formats corresponding to application 1, application 2, application 3, and application 4 over time. As can be seen from plot 300, network utilization and demand for each application varies over time. For example, plot 300 indicates that there is a period of high network utilization between times T2 and T5 (as represented by shaded region 302), and a period of low network utilization between times T6 and T8 (as represented by shaded region 304).

If the total allocated bandwidth to edge computing environment 200 is 10 Gbps (gigabits per second), then the bandwidth demand is more than the total allocated bandwidth between times T2 and T6. Typically, data transfers will be throttled accordingly, which can negatively impact the performance of some functions, such as those transferring time-critical data.

The term "time-critical data" as used in this context and elsewhere herein is intended to be broadly construed so as to encompass data that is to be prioritized for transmission. For example, time-critical data can include data that are prioritized over one or more other categories of data and/or data that are associated with a set of one or more performance constraints, such as time constraints, latency constraints, throughput constraints, and/or packet loss constraints. The term "important data" as used herein is intended to be broadly construed so as to encompass data that is also to be prioritized for transmission, but may have a different set of constraints and/or one or more different values for such constraints relative to time-critical data. As a non-limiting example, a first threshold value for a latency metric can be specified for time-critical data that is lower than a second threshold value specified for important data. It should be noted that time-critical data and important data may also have one or more different constraints. For example, important data may require a certain quality of transmission, whereas time-critical data may require a certain speed. Other data transmitted in the network are generally referred to herein as regular data. Although some embodiments are described herein with respect to three categories of data (time-critical, important, and regular), it is to be appreciated that any number of categories of data can be used depending on the implementation.

Conventional approaches attempt to address such issues by setting static network policies for each application. However, such approaches often inefficiently utilize the allocated bandwidth as a given application may receive and send data corresponding to different categories of data.

Figure 4:
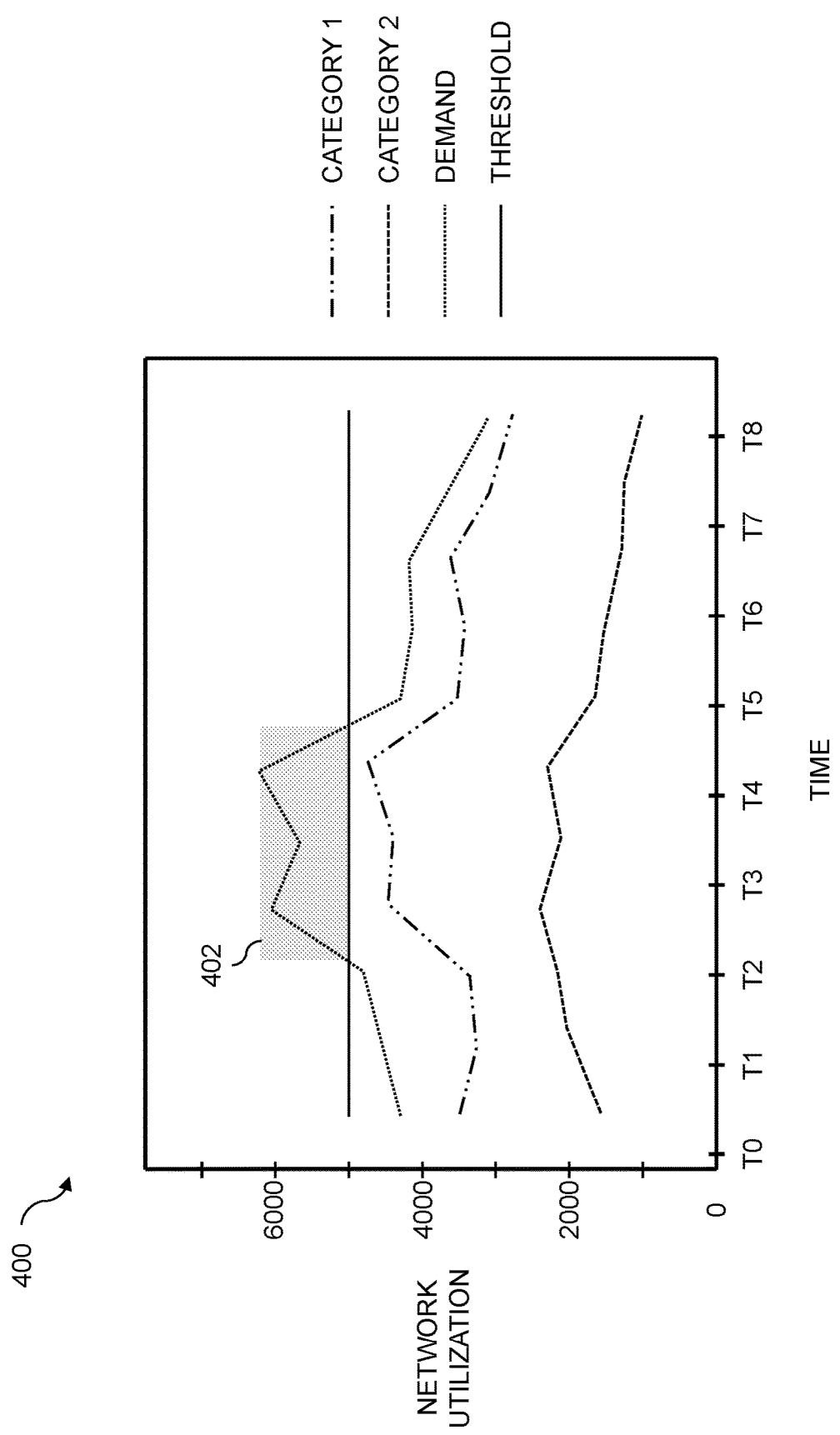
FIG. 4 shows a plot representing network utilization for different data categories in an illustrative embodiment.

For example, FIG. 4 shows a plot 400 representing network utilization for two categories of data for a given application in an illustrative embodiment. It is assumed that the application has been allocated a maximum threshold bandwidth of 5 GBs, as indicated by the solid line. The network utilization for the categories of data (category 1 and category 2) and the total demand are shown with different line dashing formats over time. As can be seen from plot 400, the threshold is exceeded between times T2 and T5, as indicated by shaded region 402. It is further noted that the network utilization for the different categories of data do not individually exceed the threshold at any point between times T0 and T8.

Conventional techniques lack mechanisms to control transfer of data for individual categories of data for a given application, and thus cannot guarantee that bandwidth is available for a particular category of data (such as time-critical data). This can cause unexpected behavior and/or delays to critical functions such as transferring health vitals data. Accordingly, at least one disadvantage with conventional techniques is that edge networks that lack a mechanism to identify different categories of data (e.g., time-critical data, important data, and regular data) produced by an individual application, and thus do not control or throttle data to avoid impacting time-critical functionality. Accordingly, in some embodiments, the cloud server 202 can include a data transfer control system 210 to address such issues. The data transfer control system 210 can control how different categories of data are transferred based at least in part on requests received from the transfer limiters 222 and the total available bandwidth of the edge computing environment 200.

Figure 5:
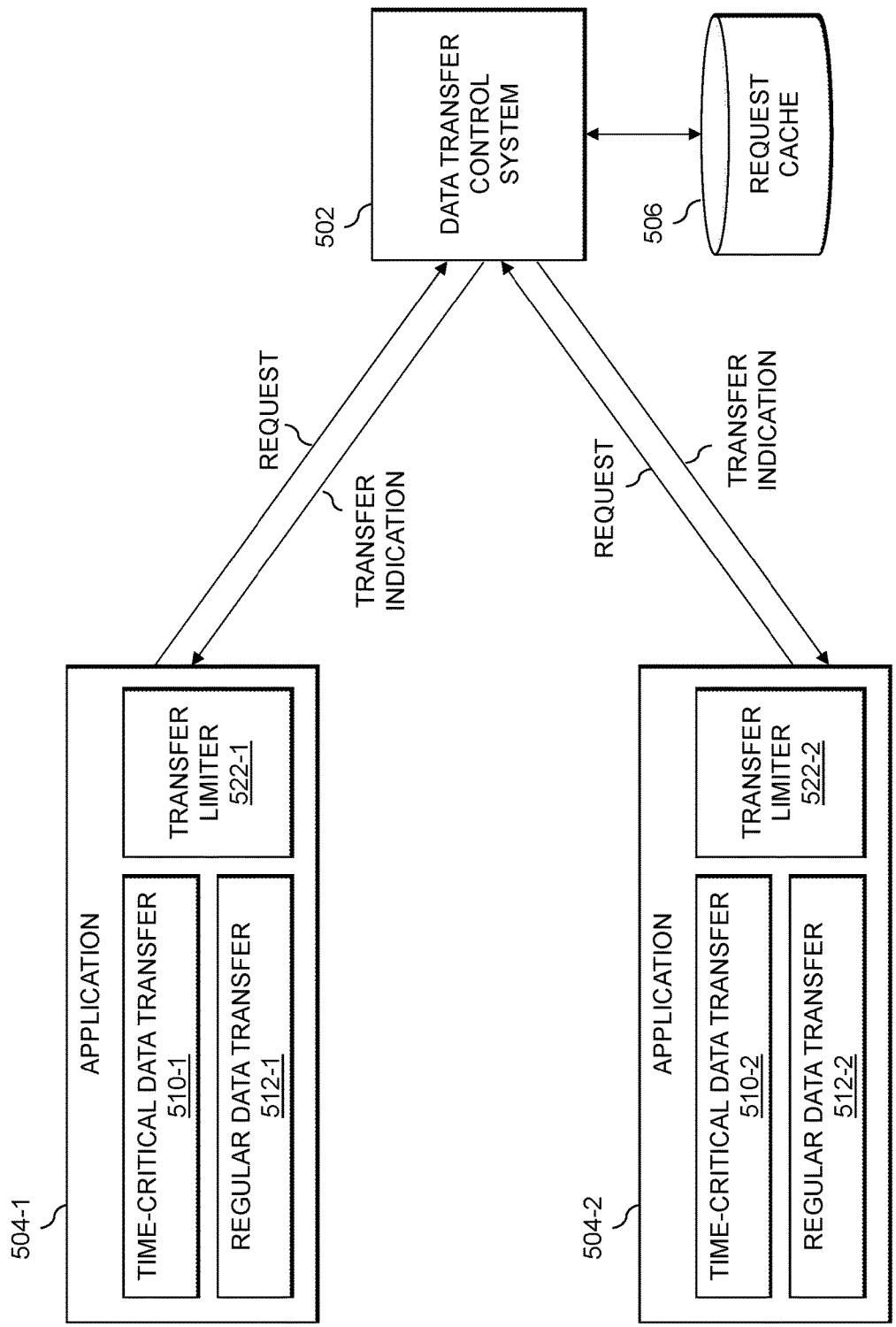
FIG. 5 shows an example implementation for controlling transfer of data at an application-level in an illustrative embodiment.

FIG. 5 shows an example implementation for controlling transfer of data based on network bandwidth demand in an illustrative embodiment. The FIG. 5 example includes a data transfer control system 502, two applications 504-1 and 504-2 (collectively referred to as applications 504), and a request cache 506. The applications 504 can be implemented on the same client device or different client devices (e.g., client devices 102).

Each of the applications 504 initiates data transfers, which include time-critical data transfers 510-1 and 510-2, and regular data transfers 512-1 and 512-2 (e.g., transfers that are not considered time critical).

Transfer limiters 522-1 and 522-2 are configured to identify the category of data to be transferred. For example, transfer limiter 522-1 is configured to identify that the time-critical data transfer 510-1 includes time-critical data and to identify that the regular data transfer 512-1 includes regular data. In some embodiments, the transfer limiter 522-1 can also determine a size and an estimated time to transfer the data corresponding to each of the data transfers 510-1 and 512-1. The transfer limiter 522-1 generates and sends respective requests to the data transfer control system 502 for the data transfers 510-1 and 512-1. For example, a given request can include the identified category of data, the size of the data, and/or the expected transfer time of the data.

In response to receiving a request from one of the applications 504, the data transfer control system 502 performs a limit check. As an example, if the request is sent by application 504-1, then the limit check can include determining if the request is for time-critical data. If yes, then the data transfer control system 502 sends a release message to the transfer limiter 522-1 indicating that the data corresponding to the request can be transferred.

Otherwise, the data transfer control system 502 evaluates the request based at least in part on the available bandwidth and/or other pending requests. For example, the data transfer control system 502 can generate entries in the request cache 506 for each request it receives.

If the request is not associated with time-critical data, then the data transfer control system 502 can compute available bandwidth using the following formula, for example:

Available Bandwidth = Total Allocated Bandwidth −
$$\left(\frac{\sum \text{Allocated Time} - \text{Critical Data}}{\text{Expected } TTT}\right) - \left(\frac{\sum \text{Allocated Regular Data}}{\text{Expected } TTT}\right)$$

The data transfer control system 502 also calculates the required bandwidth for the requests using the following formula, for example:

$$\text{Required Bandwidth} = \left(\frac{\text{Requested Regular Data Size}}{\text{Expected } TTT}\right)$$

It is noted that in the equations above the term regular data corresponds to all data that is not time-critical data, for example. If the required bandwidth is less than the available bandwidth, then the data transfer control system 502 responds to the transfer limiter 522-1 with a transfer indication indicating that the data can be transferred. Otherwise, the data transfer control system 502 provides a transfer indication indicating that the data cannot be transferred.

Accordingly, the data transfer control system 502 can maintain information of all active transfer requests in the request cache 506. The data transfer control system 502 can also include functionality for retrieving and updating entries in the request cache 506. The data transfer control system 502 can also store information indicating the total allocated bandwidth for the entire system (e.g., edge computing environment 200), as well as bandwidth that is allocated to each of the applications 504.

For example, the transfer indication can comprise a flag (e.g., a single bit), where a first value of the flag indicates that the data can be transferred, and a second value of the flag indicates that the data cannot be transferred. If the flag is set to the second value, then the transfer limiter 522-1 can pause the transfer of the data associated with the request, and then try again after a period of time (e.g., a configured time interval). The transfer limiter 522-1 can also update the data transfer control system 502 in response to completing the transfer of the data by sending another request, for example. When the data transfer control system 502 receives a release request, it deletes the corresponding entry in the request cache 506 so that the active allocated bandwidth can be updated.

As a non-limiting example, an edge computing environment can be implemented for health care data. In such an example, an edge server for a health care center can obtain data from different applications. The applications can include, for example, a patient monitoring application that collects patient vitals data via one or more connected devices and displays such data on one or more monitors. The patient monitoring application can also collect patient activity logs. In this example, the patient vitals data can be classified as time-critical data, whereas the patient activity logs may be classified as important data. Another application may include a health recording application, which uploads health record information to a central server repository. The health record information can be classified as important data, for example. Another application can include an infrastructure monitoring application, which generates usage information (such as server statistics, performance statistics of the server, and/or configuration information for edge billing and performance tracking). Such information can be classified as regular data, for example. At least some embodiments described herein can identify, in substantially real time, bandwidth requirements for the time-critical data (e.g., the patient vitals data), and control the transfer of non-critical data when there is high demand for the time-critical data.

Figure 6:
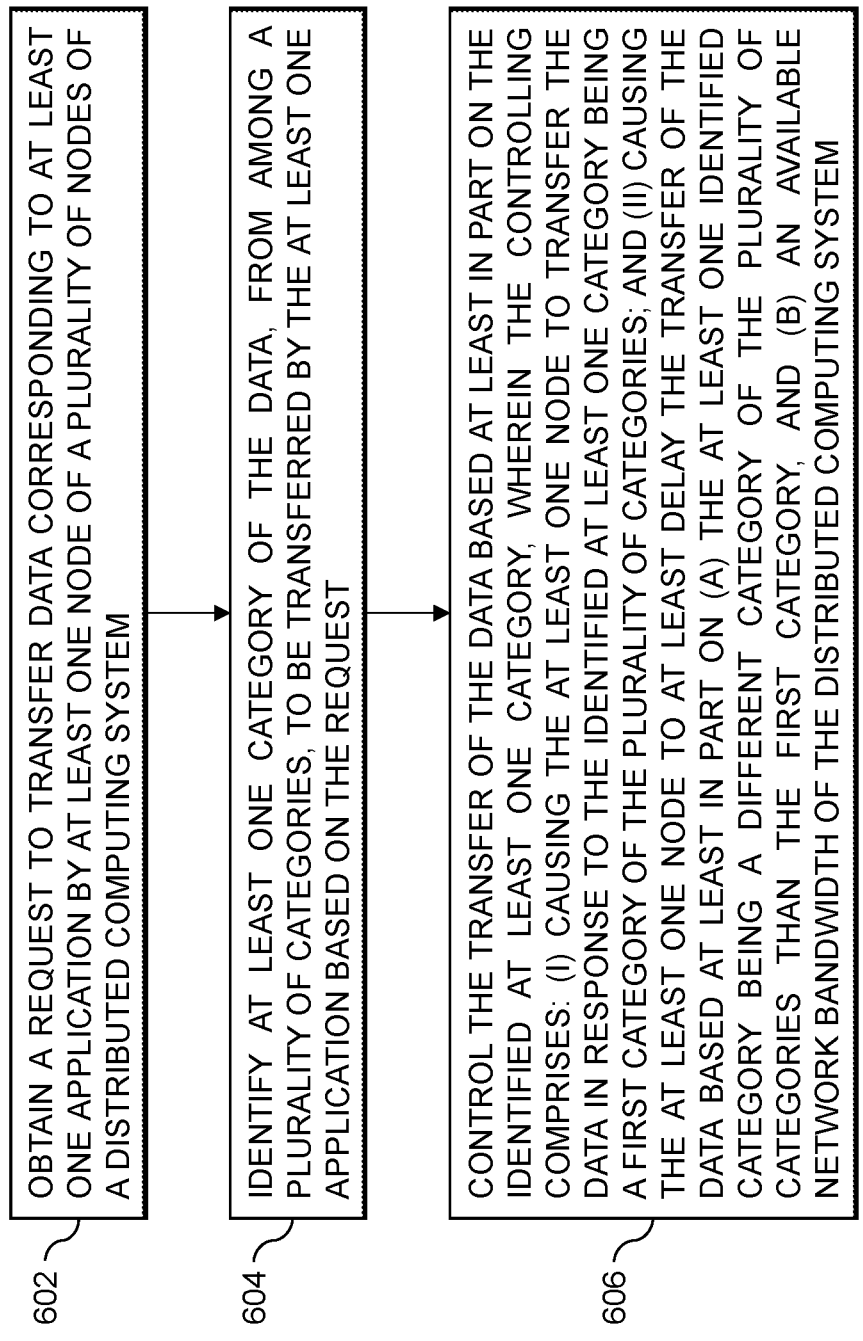
FIG. 6 shows a flow diagram of a process for controlling transfer of data based on network bandwidth demand in an illustrative embodiment.

FIG. 6 is a flow diagram of a process for controlling transfer of data based on network bandwidth demand in an illustrative embodiment. It is to be understood that this particular process is only an example, and additional or alternative processes can be carried out in other embodiments.

In this embodiment, the process includes steps 602 through 606. These steps are assumed to be performed by the data transfer control system 105 utilizing its elements 112, 114, and 116.

Step 602 includes obtaining a request to transfer data corresponding to at least one application by at least one node of a plurality of nodes of a distributed computing system.

Step 604 includes identifying at least one category of the data, from among a plurality of categories, to be transferred by the at least one application based on the request.

Step 606 includes controlling the transfer of the data based at least in part on the identified at least one category, wherein the controlling comprises: (i) causing the at least one node to transfer the data in response to the identified at least one category being a first category of the plurality of categories; and (ii) causing the at least one node to at least delay the transfer of the data based at least in part on (a) the at least one identified category being a different category of the plurality of categories than the first category, and (b) an available network bandwidth of the distributed computing system.

The causing the at least one node to transfer the data may include sending a first value to the at least one node. The causing the at least one node to at least delay the transfer of the data may include sending a given one of one or more different values to the at least one node. The first category of the plurality of categories may indicate the data to be transferred comprises time-critical data; and the different category of the plurality of categories may indicate the data to be transferred comprises data that is not time-critical data. The request may include information indicating at least one of: the at least one category of the data; a size of the data to be transferred; and an estimated time to transfer the data. The process may further include a step of maintaining at least some of the information corresponding to the request and at least some information corresponding to one or more other requests to transfer data by at least some of the plurality of nodes in a database, wherein the causing the at least one node to at least delay the transfer of the data is further based at least in part on the information stored in the database. The maintaining may include deleting the information corresponding to a given request in response to obtaining an indication that the transfer of the data corresponding to the given request is completed. The process may further include the following steps: computing a network bandwidth required to transfer the data based at least in part on the obtained request; and computing the available network bandwidth based at least in part on the information stored in the database. The database may further include bandwidth information comprising at least one of: a maximum bandwidth allocated to the distributed computing system; at least one bandwidth threshold allocated to the at least one application; and at least one bandwidth threshold allocated to one or more other applications. The at least one node may send an additional request to transfer the data corresponding to the at least one application subsequent to obtaining the second value. The controlling may be based at least in part on a current demand of the available network bandwidth for transfers of data of the first category across the plurality of nodes. The distributed computing system may include an edge computing system.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve bandwidth utilization, such as in edge computing environments. For example, some embodiments are configured to control data transfers for individual applications based on the category of data to be transferred and the bandwidth demand. These and other embodiments can effectively improve the availability of bandwidth for a particular category of data (e.g., to avoid impacting time-critical functionality.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
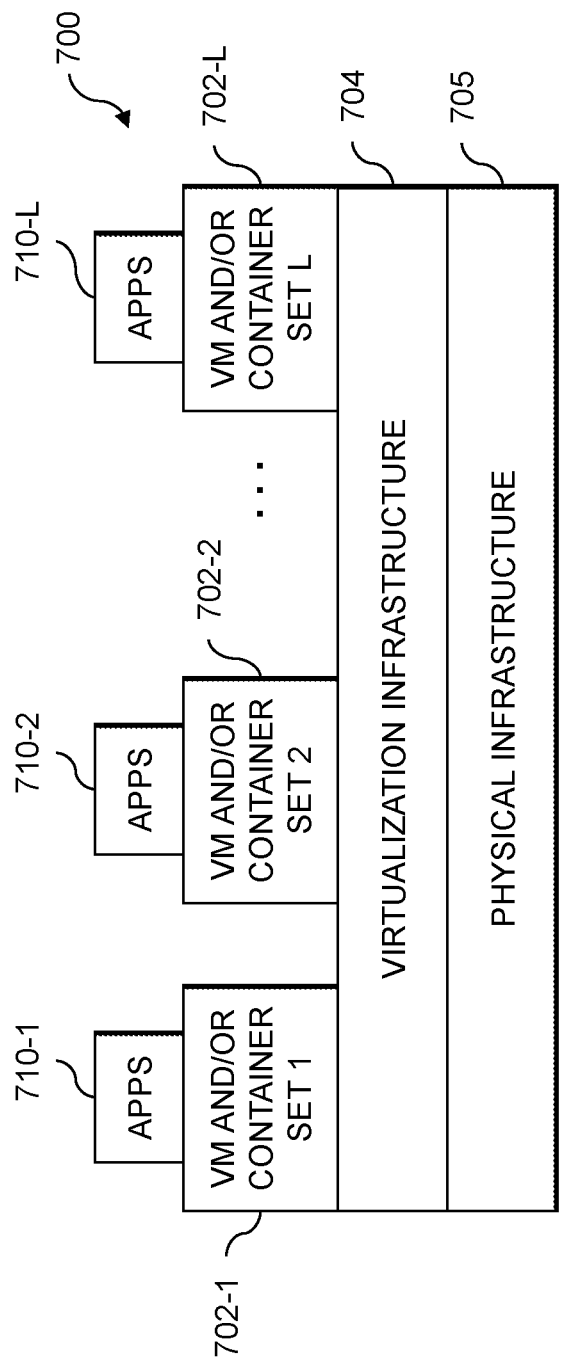
FIGS. 7 and 8 show examples of processing platforms that may be utilized to implement at least a portion of an information processing system in illustrative embodiments.
Figure 8:
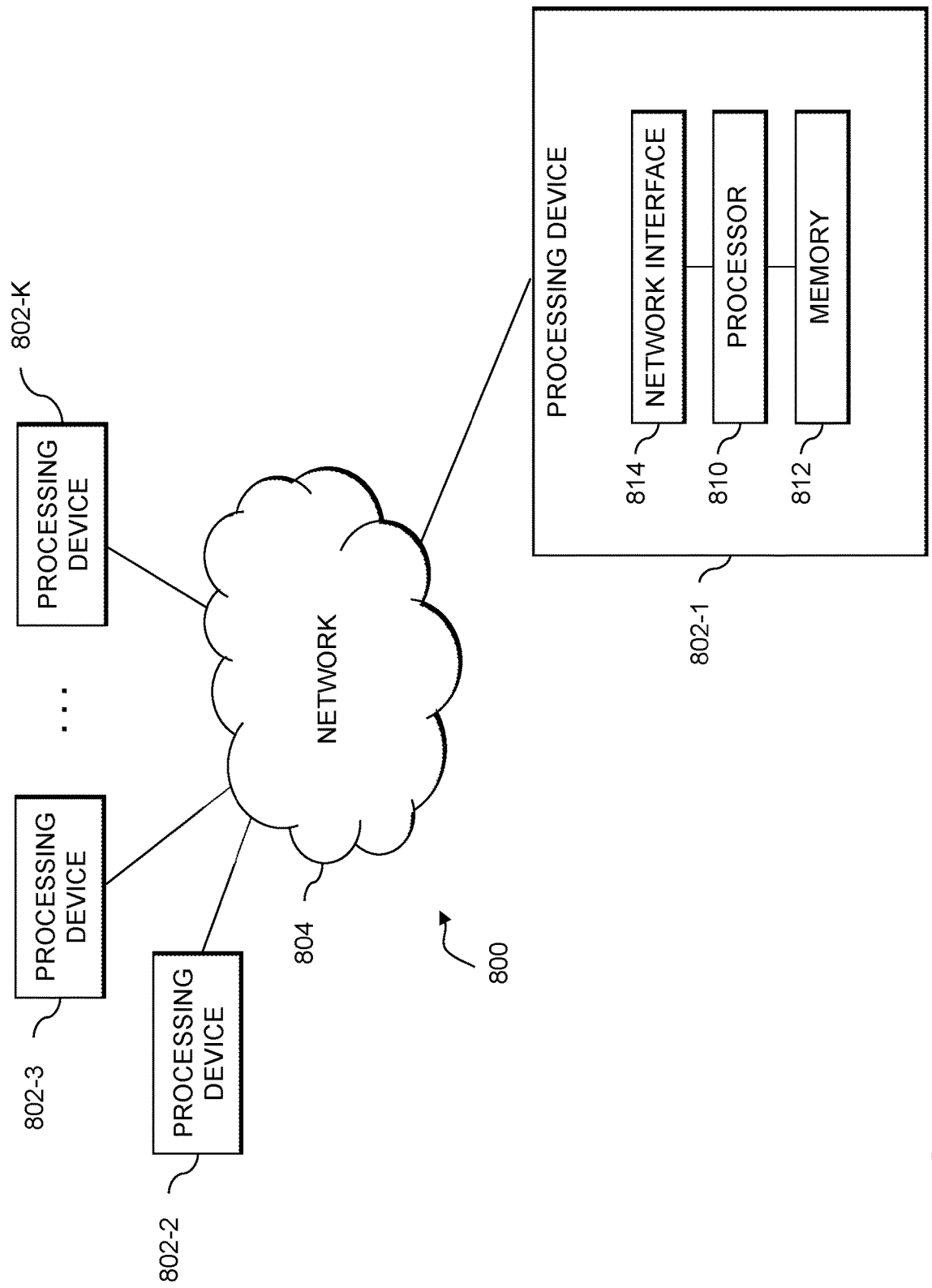

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an ASIC, an FPGA or other type of processing circuitry, as well as portions or combinations of such circuitry elements.

The memory 812 comprises RAM, ROM or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining at least one request to transfer data corresponding to at least one application by at least one node of a plurality of nodes of a distributed computing system;
identifying at least two categories of the data, from among a plurality of categories, to be transferred by the at least one application based on the at least one request; and
controlling the transfer of the data, wherein the controlling comprises: (i) causing the at least one node to transfer at least a first portion of the data in response to the first portion of the data being a first category of the plurality of categories; and (ii) causing the at least one node to at least delay the transfer of at least a second portion of the data based at least in part on (a) the second portion of the data being a different category of the plurality of categories than the first category, and (b) an available network bandwidth of the distributed computing system;
wherein the method is performed by at least one processing device comprising a processor coupled to a memory.

2. The computer-implemented method of claim 1, wherein at least one of:
the causing the at least one node to transfer the first portion of the data comprises sending a first value to the at least one node; and
the causing the at least one node to at least delay the transfer of the second portion of the data comprises sending a given one of one or more different values to the at least one node.

3. The computer-implemented method of claim 1, wherein:
the first category of the plurality of categories indicates the first portion of the data to be transferred comprises time-critical data; and
the different category of the plurality of categories indicates the second portion of the data to be transferred comprises data that is not time-critical data.

4. The computer-implemented method of claim 1, wherein the at least one request comprises information indicating at least one of:
the at least two categories of the data;
a size of the data to be transferred; and
an estimated time to transfer the data.

5. The computer-implemented method of claim 4, further comprising:

maintaining at least some of the information corresponding to the at least one request and at least some information corresponding to one or more other requests to transfer data by at least some of the plurality of nodes in a database, wherein the causing the at least one node to at least delay the transfer of the second portion of the data is further based at least in part on the information stored in the database.

6. The computer-implemented method of claim 5, wherein the maintaining comprises:
deleting the information corresponding to a given request in response to obtaining an indication that the transfer of the data corresponding to the given request is completed.

7. The computer-implemented method of claim 5, further comprising:
computing a network bandwidth required to transfer at least the first portion of the data and the second portion of the data based at least in part on the obtained at least one request; and
computing the available network bandwidth based at least in part on the information stored in the database.

8. The computer-implemented method of claim 5, wherein the database further comprises bandwidth information comprising at least one of:
a maximum bandwidth allocated to the distributed computing system;
at least one bandwidth threshold allocated to the at least one application; and
at least one bandwidth threshold allocated to one or more other applications.

9. The computer-implemented method of claim 2, wherein the at least one node sends at least one_additional request to transfer the data corresponding to the at least one application subsequent to obtaining the given one of the one or more different values.

10. The computer-implemented method of claim 1, wherein the controlling is based at least in part on a current demand of the available network bandwidth for transfers of data of the first category across the plurality of nodes.

11. The computer-implemented method of claim 1, wherein the distributed computing system comprises an edge computing system.

12. A non-transitory processor-readable storage medium having stored therein program code of one or more software programs, wherein the program code when executed by at least one processing device causes the at least one processing device:
to obtain at least one request to transfer data corresponding to at least one application by at least one node of a plurality of nodes of a distributed computing system;
to identify at least two categories of the data, from among a plurality of categories, to be transferred by the at least one application based on the at least one request; and
to control the transfer of the data, wherein the controlling comprises: (i) causing the at least one node to transfer at least a first portion of the data in response to the first portion of the data being a first category of the plurality of categories; and (ii) causing the at least one node to at least delay the transfer of at least a second portion of the data based at least in part on (a) the second portion of the data being a different category of the plurality of categories than the first category, and (b) an available network bandwidth of the distributed computing system.

13. The non-transitory processor-readable storage medium of claim 12, wherein at least one of:

the causing the at least one node to transfer the first portion of the data comprises sending a first value to the at least one node; and the causing the at least one node to at least delay the transfer of the second portion of the data comprises sending a given one of one or more different values to the at least one node.

14. The non-transitory processor-readable storage medium of claim 12, wherein:

the first category of the plurality of categories indicates the first portion of the data to be transferred comprises time-critical data; and the different category of the plurality of categories indicates the second portion of the data to be transferred comprises data that is not time-critical data.

15. The non-transitory processor-readable storage medium of claim 12, wherein the at least one request comprises information indicating at least one of:

the at least two categories of the data;

a size of the data to be transferred; and an estimated time to transfer the data.

16. An apparatus comprising:

at least one processing device comprising a processor coupled to a memory;

the at least one processing device being configured:

to obtain at least one request to transfer data corresponding to at least one application by at least one node of a plurality of nodes of a distributed computing system;

to identify at least two categories of the data, from among a plurality of categories, to be transferred by the at least one application based on the at least one request; and to control the transfer of the data, wherein the controlling comprises: (i) causing the at least one node to transfer at least a first portion of the data in response to the first portion of the data being a first category of the plurality of categories; and (ii) causing the at least one node to at least delay the transfer of at least a second portion of the data based at least in part on (a) the second portion of the data being a different category of the plurality of categories than the first category, and (b) an available network bandwidth of the distributed computing system.

17. The apparatus of claim 16, wherein at least one of:

the causing the at least one node to transfer the first portion of the data comprises sending a first value to the at least one node; and the causing the at least one node to at least delay the transfer of the second portion of the data comprises sending a given one of one or more different values to the at least one node.

18. The apparatus of claim 16, wherein:

the first category of the plurality of categories indicates the first portion of the data to be transferred comprises time-critical data; and the different category of the plurality of categories indicates the second portion of the data to be transferred comprises data that is not time-critical data.

19. The apparatus of claim 16, wherein the at least one request comprises information indicating at least one of:

the at least two categories of the data;

a size of the data to be transferred; and an estimated time to transfer the data.

20. The apparatus of claim 16, wherein the controlling is based at least in part on a current demand of the available network bandwidth for transfers of data of the first category across the plurality of nodes.

\* \* \* \* \*